US010656662B2

United States Patent
Goto et al.

(10) Patent No.: US 10,656,662 B2
(45) Date of Patent: May 19, 2020

(54) VARIABLE PRESSURE DEVICE AND ACTUATOR

(71) Applicant: KABUSHIKI KAISHA TOSHIBA, Tokyo (JP)

(72) Inventors: Tatsuhiko Goto, Kawasaki Kanagawa (JP); Junichiro Ooga, Kawasaki Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 66 days.

(21) Appl. No.: 15/899,534

(22) Filed: Feb. 20, 2018

(65) Prior Publication Data

US 2019/0085877 A1  Mar. 21, 2019

(30) Foreign Application Priority Data

Sep. 15, 2017 (JP) ................................. 2017-177332

(51) Int. Cl.
*F15B 13/08* (2006.01)
*G05D 16/20* (2006.01)

(52) U.S. Cl.
CPC ..... *G05D 16/2026* (2013.01); *F15B 13/0871* (2013.01); *F15B 13/0814* (2013.01); *F15B 2211/40553* (2013.01); *F15B 2211/7128* (2013.01)

(58) Field of Classification Search
CPC ............... F15B 2211/40553; F15B 2211/7128
USPC .................. 137/599.04, 599.05, 599.06, 883
See application file for complete search history.

(56) References Cited

U.S. PATENT DOCUMENTS

| 3,081,942 A * | 3/1963 | MacLay | F15C 4/00 137/599.04 |
| 3,905,394 A * | 9/1975 | Jerde | B01F 3/026 137/599.04 |
| 4,191,215 A * | 3/1980 | Gonner | F15B 11/0426 137/599.05 |
| 4,915,123 A * | 4/1990 | Morgovsky | B01F 3/026 137/599.04 |
| 5,520,333 A * | 5/1996 | Tofte | A01B 79/005 137/599.05 |
| 5,875,817 A * | 3/1999 | Carter | G01F 1/363 137/599.06 |
| 6,263,904 B1 * | 7/2001 | Zdunek | C23C 8/02 118/728 |
| 6,532,978 B1 * | 3/2003 | Muller-Kuhrt | G05D 11/132 137/1 |

(Continued)

FOREIGN PATENT DOCUMENTS

JP  63-119906  8/1988
JP  01-216104  8/1989

(Continued)

*Primary Examiner* — Seth W. MacKay-Smith
(74) *Attorney, Agent, or Firm* — Finnegan, Henderson, Farabow, Garrett & Dunner, L.L.P.

(57) ABSTRACT

According to an embodiment, a variable pressure device includes a channel constituting unit and a switch valve mechanism. The channel constituting unit constitutes a channel including a first regulator and second regulators that are arranged in series to the first regulator and are in parallel to one another. The switch valve mechanism selectively connects the second regulators to the first regulator. Opening areas of the second regulators are different from one another.

6 Claims, 8 Drawing Sheets

(56) References Cited

U.S. PATENT DOCUMENTS

| | | | |
|---|---|---|---|
| 6,752,166 B2 * | 6/2004 | Lull ..................... | G05D 7/0664 |
| | | | 118/715 |
| 7,007,707 B2 * | 3/2006 | Ambrosina .............. | G01F 1/68 |
| | | | 137/101.19 |
| 7,900,652 B2 * | 3/2011 | North ................. | C23C 16/4412 |
| | | | 137/883 |
| 8,905,074 B2 * | 12/2014 | Cobb ...................... | F16K 51/02 |
| | | | 137/599.06 |
| 9,151,018 B2 * | 10/2015 | Knussman ............ | E02F 9/2217 |
| 9,279,236 B2 * | 3/2016 | Zhang .................. | E02F 9/2217 |
| 2007/0130932 A1 | 6/2007 | Fatemi et al. | |
| 2013/0283843 A1 | 10/2013 | Takenaka et al. | |
| 2017/0328381 A1 | 11/2017 | Goto et al. | |
| 2017/0328384 A1 | 11/2017 | Goto et al. | |

FOREIGN PATENT DOCUMENTS

| | | |
|---|---|---|
| JP | 02-039308 | 2/1990 |
| JP | 02-173487 | 7/1990 |
| JP | 04-285377 | 10/1992 |
| JP | 08-161057 | 6/1996 |
| JP | 3203002 | 6/2001 |
| JP | 2008-136664 | 6/2008 |
| JP | 5627713 | 10/2014 |
| JP | 2017-203529 | 11/2017 |
| JP | 2017-203535 | 11/2017 |

* cited by examiner

VARIABLE PRESSURE DEVICE AND ACTUATOR

CROSS-REFERENCE TO RELATED APPLICATIONS

This application is based upon and claims the benefit of priority from Japanese Patent Application No. 2017-177332, filed on Sep. 15, 2017; the entire contents of which are incorporated herein by reference.

FIELD

Embodiments described herein relate generally to a variable pressure device and an actuator.

BACKGROUND

Conventionally, there is known a variable pressure device that has a pressure control valve and can set a pressure in two stages.

It is beneficial to obtain a variable pressure device with less disadvantages and an actuator including the variable pressure device, for example, that can change a pressure in three or more stages with a simpler mechanism.

DETAILED DESCRIPTION

According to an embodiment, a variable pressure device includes a channel constituting unit and a switch valve mechanism. The channel constituting unit constitutes a channel including a first regulator and second regulators that are arranged in series to the first regulator and are in parallel to one another. The switch valve mechanism selectively connects the second regulators to the first regulator. Opening areas of the second regulators are different from one another.

Exemplary embodiments of the present invention will be disclosed below. Configurations and control (technical characteristics) of the embodiments described below, and operations and results (effects) due to the configurations and control are only examples. Same constituent elements are included in the plurality of embodiments exemplified below. Therefore, in the respective embodiments, same operations and effects based on same configurations can be obtained. In the following descriptions, such same constituent elements are denoted by same reference signs, and redundant explanations thereof are omitted.

First Embodiment

Figure 1:
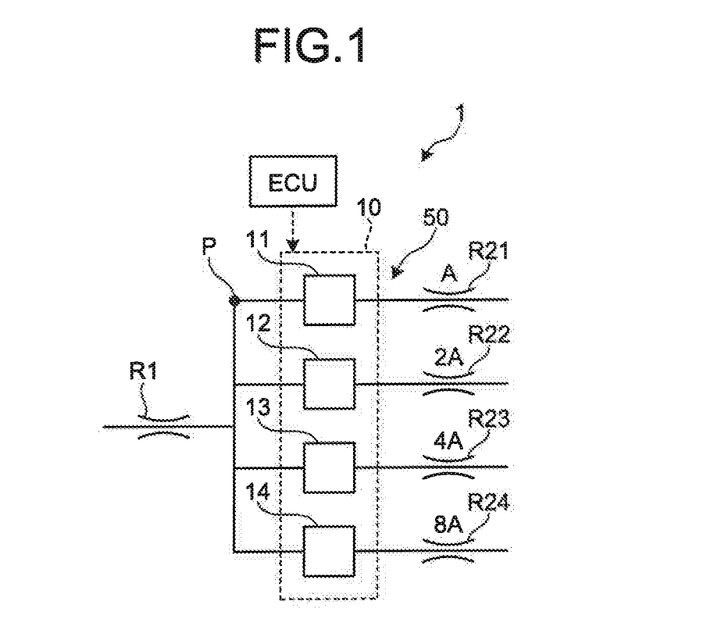
FIG. 1 is a schematic configuration diagram schematically and exemplarily illustrating a variable pressure device according to a first embodiment.

FIG. 1 is a schematic configuration diagram of a variable pressure device 1. The variable pressure device 1 includes a channel constituting unit 50, a switch valve mechanism 10, and an ECU (electronic control unit). The variable pressure device 1 changes the pressure of a fluid at a predetermined point P by an operation of the switch valve mechanism 10 controlled by the ECU. The ECU is an example of a control unit.

The channel constituting unit 50 is a member, such as a pipe, a tube, or a block. The channel constituting unit 50 is provided with a channel, such as a hole or a chamber. The channel constituting unit 50 can be constituted by a combination of a plurality of members.

The channel constituting unit 50 includes a first regulator R1 and a plurality of second regulators R21 to R24. The second regulators R21 to R24 are each arranged in series to the first regulator R1 and are arranged in parallel to one another. Each of the first regulator R1 and the second regulators R21 to R24 is an orifice or a choke, for example. The first regulator R1 may be constituted to be exchangeable or as a variable regulator including a movable portion that can change an opening area (channel resistance). The following description is made with reference to a case where the pressure of the fluid on a side of the first regulator R1, which is close to the second regulators R21 to R24, is low and the pressure of the fluid on the opposite side to the second regulators R21 to R24 is high, that is, a case where the fluid flows from the first regulator R1 to the second regulators R21 to R24, as an example. A high-pressure source of the fluid is a pump or a cylinder, for example. Further, a silencer or the like is provided at an exhaust port as necessary.

The opening areas of the second regulators R21 to R24 are different from one another. Specifically, the opening area of the second regulator R21 is A, the opening area of the second regulator R22 is 2A that is twice the opening area of the second regulator R21, the opening area of the second regulator R23 is 4A that is four times the opening area of the second regulator R21, and the opening area of the second regulator R24 is 8A that is eight times the opening area of the second regulator R21, for example. In this case, the opening area Ai can be represented by the following Expression (1).

$$Ai = A \times 2^{(i-1)} \quad (1)$$

In Expression (1), i=1, 2, . . . , n, and n is the number of the second regulators R21 to R24 and is an integer larger than 1. A is the opening area of the second regulator R21 that has the smallest opening area, and can be referred to as "unit opening area". Although a case where the number n is 4 (n=4) is described as an example in a first embodiment, the number n is not limited to 4. The number n may be 2, 3, or 5 or more.

The switch valve mechanism 10 includes a plurality of valves 11 to 14 that are parallel to one another. Each of the valves 11 to 14 is a solenoid valve (on-off valve) electrically driven by the ECU, and switches an open state and a closed state of a channel. The valve 11 is provided between the first regulator R1 and the second regulator R21 and switches connection and disconnection of a channel between the first regulator R1 and the second regulator R21. The valve 12 is provided between the first regulator R1 and the second regulator R22 and switches connection and disconnection of a channel between the first regulator R1 and the second regulator R22. The valve 13 is provided between the first regulator R1 and the second regulator R23 and switches connection and disconnection of a channel between the first regulator R1 and the second regulator R23. The valve 14 is provided between the first regulator R1 and the second regulator R24 and switches connection and disconnection of a channel between the first regulator R1 and the second regulator R24. When any of the valves 11 no 14 is opened, the fluid flows from the upstream side of the first regulator R1 (the left side in FIG. 1) to the downstream side (the right side in FIG. 1) of one of the second regulators R21 to R24 corresponding to the opened one of the valves 11 to 14, and flows out of the channel constituting unit 50. On the other hand, when any of the valves 11 to 14 is closed, one of the second regulators R21 to R24 corresponding to the closed one of the valves 11 to 14 is not connected to the first regulator R1, and therefore the fluid does not flow to the downstream side of the closed one of the valves 11 to 14. In this manner, the switch valve mechanism 10 selectively connects the second regulators R21 to R24 to the first regulator R1 by switching opening and closing of the valves 11 to 14.

The ECU is a computer, and can include a controller, a main memory device, an auxiliary memory device, and a driving circuit (not illustrated), for example. The controller can achieve functions as the ECU by performing arithmetic processing in accordance with an installed program (application, software). At least a portion of the functions of the ECU may be achieved by hardware, such as an ASIC (application specific integrated circuit), a FPGA (field-programmable gate array), or a DSP (digital signal processor). The driving circuit receives an instruction signal from the controller, and outputs a control signal (electric signal) that switches the state of each of the valves 11 to 14 in accordance with the instruction signal. The driving circuit includes a power supply circuit and a switching element, for example, and switches opening and closing of the switching element in accordance with the instruction signal to output the control signal that causes a driving portion of each of the valves 11 to 14 to operate.

In the present embodiment, the opening areas of the second regulators R21 to R24 are powers of 2 times the unit opening area A, as described above. Therefore, according to the present embodiment, by changing a combination of the first regulator R1 and one or more of the second regulators R21 to R24 connected to the first regulator R1, it is possible to switch the total value of the opening areas of the second regulators R21 to R24 (hereinafter, also simply referred to as "total value") in a range from 1 to 15 times the unit opening area A by one time increment. That is, in the present embodiment, it is possible to obtain the total values A, 2A, . . . , 15A by addition of the opening areas A, 2A, 3A, and 4A of the second regulators R21 to R24 in the combination. From the fact that all decimal numbers can be represented by switching "0" and "1" of each digit (each bit) of a binary number, it can be understood that it is possible to switch the total values in the manner described above. Specifically, when only the valve 11 is in an open state and only the second regulator R21 is connected to the first regulator R1, for example, the total value is A. When only the valve 12 is in an open state and only the second regulator R22 is connected to the first regulator R1, the total value is 2A. When only the valves 11 and 12 are in an open state and only the second regulators R21 and R22 are connected to the first regulator R1, the total value is 3A. When only the valve 13 is in an open state and only the second regulator R23 is connected to the first regulator R1, the total value is 4A.

It is apparent from the circuit configuration in FIG. 1 that the pressure at the predetermined point P is higher as the total value is smaller, and is lower as the total value is larger. Therefore, it is possible to variably set the pressure at the predetermined point P by switching the open state and the closed state of each of the valves 11 to 14.

Figure 2:
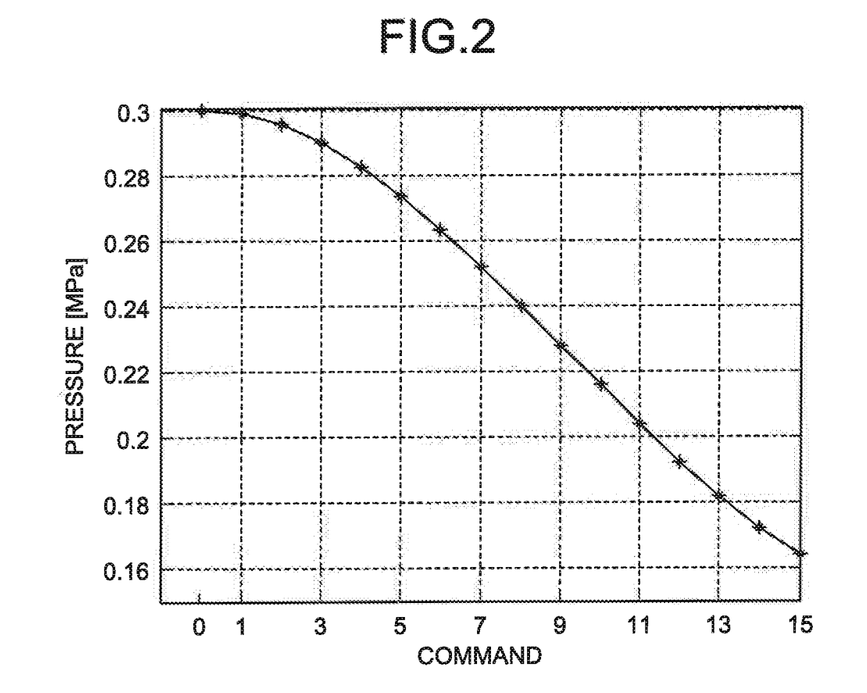
FIG. 2 is a graph illustrating an example of pressures that can be set in multiple stages by the variable pressure device according to the first embodiment.

FIG. 2 is a graph illustrating an example of pressures that can be set by the variable pressure device 1 in multiple stages. The vertical axis represents the pressure. The horizontal axis in FIG. 2 represents binary commands in decimal numbers, in each of which an instruction for each of the second regulators R21 to R24 is assigned to a lower digit as the opening area of the second regulator is smaller, assuming that an opening instruction from an ECU to each of the valves 11 to 14 is "1" and a closing instruction (no opening instruction) is "0". Specifically, in a case where all the valves 11 to 14 are closed, for example, a command is "0000" in binary number and "0" in decimal number. In a case where the valves 11 and 12 are "open" and the valves 13 and 14 are "closed", a command is "0011" in binary number and "3" in decimal number. In a case where the valves 11, 13, and 14 are "open" and the valve 12 is "closed", a command is "1101" in binary number and "13" in decimal number. A value of the command represents a multiple number with respect to the unit opening area A to obtain the total value. That is, as the command value is larger, the total value of the opening areas of the second regulators R21 to R24 is larger. Even in a case where the opening areas of the second regulators R21 to R24 are not powers of 2 times the unit opening area A, the pressure at the predetermined point P can be changed in accordance with the magnitude of the total value by performing switching in an identical manner.

As described above, in the present embodiment, the opening areas of the second regulators R21 to R24 are different from one another. Therefore, by switching a predetermined number of valves 11 to 14 corresponding to the predetermined number of second regulators R21 to R24, that is, a combination of one or more of the valves 11 to 14 that are in an open state or a combination of one or more of the valves 11 to 14 that are in a closed state, it is possible to switch the pressure at the predetermined point P in a number of stages, the number being larger than the predetermined number. Therefore, according to the present embodiment, it is possible to constitute the variable pressure device 1 to be more compact or simpler, as compared with a configuration in which the pressure at the predetermined point P can be switched in the same number of stages as the number of the valves 11 to 14, for example.

Also, in the present embodiment, the second regulators R21 to R24 include n regulators each having an opening area of $A \times 2^{(i-1)}$ (where A is a positive real number, i=1, 2, ..., n, and n is an integer larger than 1). Therefore, it is possible to switch the total value of the opening areas of the second regulators R21 to R24 in one time increments in a range from 1 to 15 times the unit opening area A. Therefore, according to the present embodiment, the pressure at each stage can be controlled more easily, as compared with a case where each of the opening areas of the second regulators R21 to R24 is not powers of 2 times the unit opening area A but is at random, for example.

Second Embodiment

Figure 3:
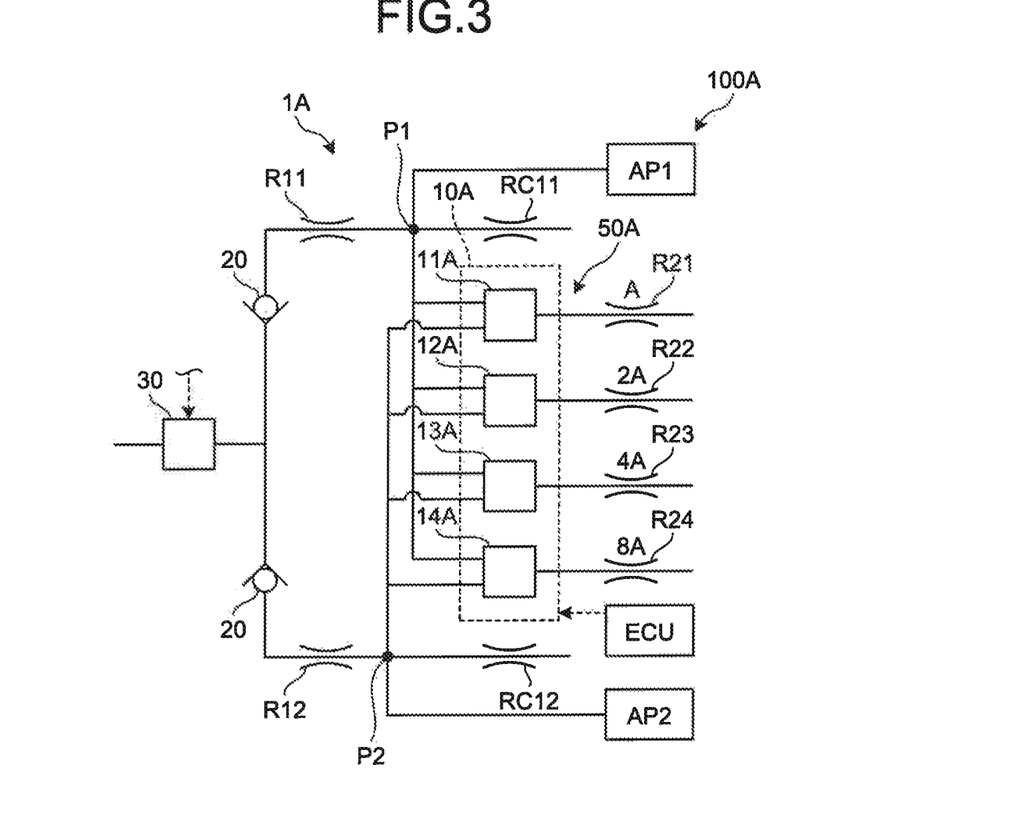
FIG. 3 is a schematic configuration diagram schematically and exemplarily illustrating an actuator including a variable pressure device according to a second embodiment.

FIG. 3 is a schematic configuration diagram of an actuator 100A including a variable pressure device 1A. A channel constituting unit 50A of the variable pressure device 1A includes two first regulators R11 and R12 parallel to each other. The two first regulators R11 and R12 are each arranged in series to the second regulators R21 to R24. Further, a switch valve mechanism 10A includes a plurality of valves 11A to 14A parallel to one another. The valves 11A to 14A have the same configuration.

Figure 4:
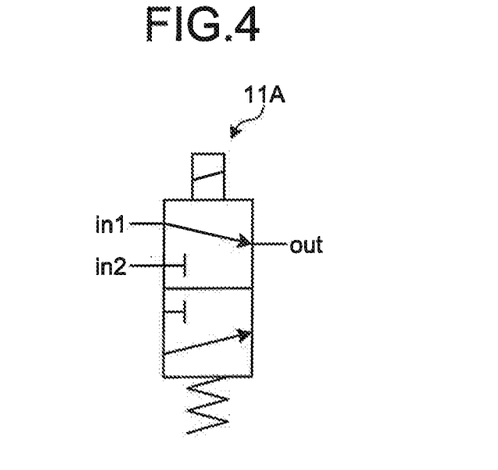
FIG. 4 is a schematic configuration diagram schematically and exemplarily illustrating a valve included in the variable pressure device according to the second embodiment.

FIG. 4 is a schematic configuration diagram of the valve 11A. As illustrated in FIG. 4, in each of the valves 11A to 14A, ports in1 and in2 communicating with the two first regulators R11 and R12, respectively, are selectively connected to a port out communicating with one of the second regulators R21 to R24 corresponding to the valve. Therefore, each of the valves 11A to 14A can switch a state where it connects one of the two first regulators R11 and R12 and the corresponding one of the second regulators R21 to R24 to each other and a state where it connects the other of the two first regulators R11 and R12 and the corresponding one of the second regulators R21 to R24 to each other. That is, the switch valve mechanism 10A connects at least one of the second regulators R21 to R24 to one of the two first regulators R11 and R12 and also connects the remaining ones of the second regulators R21 to R24 to the other of the two first regulators R11 and R12.

As illustrated in FIG. 3, in the variable pressure device 1A, the pressure at a predetermined point P1 between one first regulator R11 and the switch valve mechanism 10A acts on a first operating unit AP1 of the actuator 100A. Also, the pressure at a predetermined point P2 between the other first regulator R12 and the switch valve mechanism 10A acts on a second operating unit AP2 of the actuator 100A.

In addition, the variable pressure device 1A includes a pressure control valve 30. The channel constituting unit 50A includes first adjusting regulators RC11 and RC12 and a check valve 20.

The pressure control valve 30 is a linear solenoid valve, for example, and can variably set a pressure (set pressure, original pressure) in a channel in the channel constituting unit 50A, specifically on the upstream side of the first regulators R11 and R12 by being electrically controlled by an ECU. The pressure control valve 30 can be also referred to as "pressure adjusting valve" or "variable pressure control valve".

The first adjusting regulator RC11 is arranged in series to the first regulator R11 and is arranged in parallel to the switch valve mechanism 10A and the second regulators R21 to R24. The first adjusting regulator RC12 is arranged in series to the first regulator R12 and is arranged in parallel to the switch valve mechanism 10A and the second regulators R21 to R24. Due to the first adjusting regulator RC11, the pressure at the predetermined point P1 is lowered as compared with a case where it is not provided. Due to the first adjusting regulator RC12, the pressure at the predetermined point P2 is lowered as compared with a case where it is not provided. Although the first adjusting regulators RC11 and RC12 have the same specification, such as an opening area, these regulators may be different from each other. Further, each of the first adjusting regulators RC11 and RC12 may be constituted to be exchangeable or as a variable regulator having an opening area (channel resistance) that can be electrically changed by the ECU.

The check valve 20 allows a fluid to flow from the pressure control valve 30 to the first regulators R11 and R12 and prevents the fluid from flowing from the first regulators R11 and R12 to the pressure control valve 30.

Figure 5:
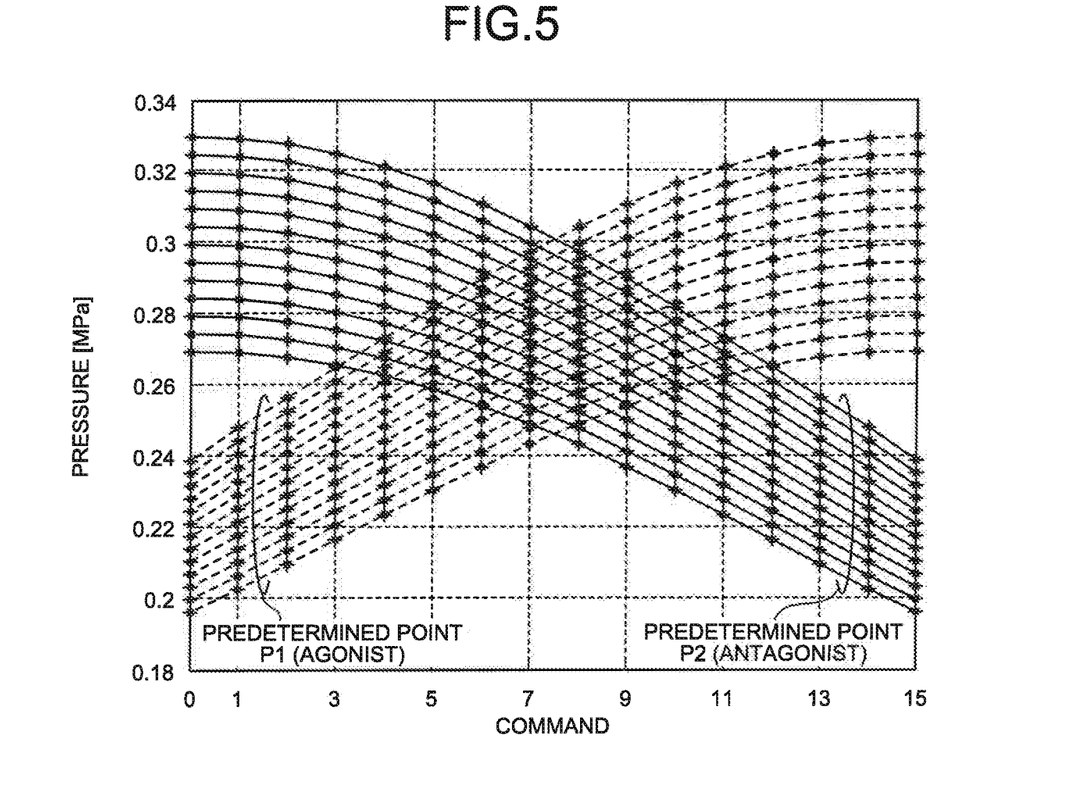
FIG. 5 is a graph illustrating an example of pressures that can be set in multiple stages by the variable pressure device according to the second embodiment.

FIG. 5 is a graph illustrating an example of pressures that can be set by the variable pressure device 1A in multiple stages. With the configuration illustrated in FIG. 3, the pressures characteristics at the predetermined points P1 and P2 are obtained as illustrated in FIG. 5, in which the pressure at the predetermined point P2 is low when the pressure at the predetermined point P1 is high, gradually becomes higher from a state where the pressure at the predetermined point P2 is low as the pressure at the predetermined point P1 gradually becomes lower from a state where the pressure at the predetermined point P1 is high, and is high when the pressure at the predetermined point P1 is low. In the following descriptions, these characteristics are referred to as "conflicting characteristics of pressures" In FIG. 5, graphs are illustrated in a plurality of cases where pressures set by the pressure control valve 30 are different from one another, for each of the pressures at the predetermined points P1 and P2.

Figure 6:
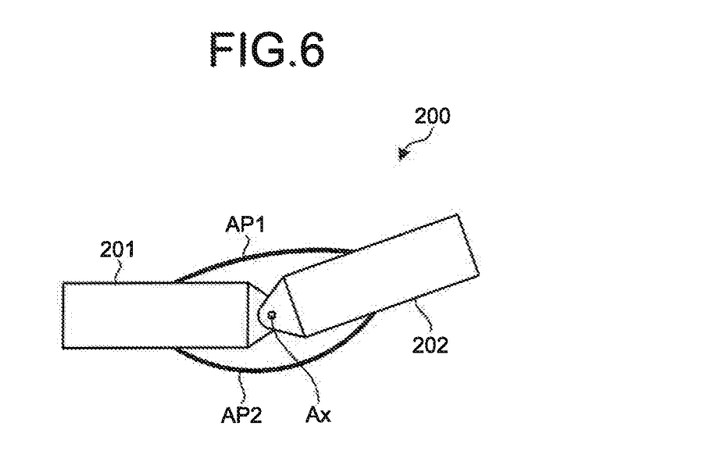
FIG. 6 is a schematic configuration diagram schematically and exemplarily illustrating a system to which the actuator according to the second embodiment is applied.

FIG. 6 is a schematic configuration diagram of an actuation system 200 to which the first operating unit AP1 and the second operating unit AP2 in FIG. 3 are applied. The actuation system 200 includes two movable members 201 and 202 connected to be rotatable around a rotation center Ax. The movable members 201 and 202 are joint arms, for example. The first operating unit AP1 and the second operating unit AP2 are McKibben artificial muscles that changes relative angles of the movable members 201 and 202 around the rotation center Ax, for example. The McKibben artificial muscle includes a tube that is formed by an extendable elastic material, such as elastomer, and is closed at an end in a longitudinal direction, and a mesh that encloses the tube and is formed by a synthetic fiber material, for example. The McKibben artificial muscle expands in a radial direction (a transverse direction) and contracts in an axial direction in a supply state where gas (air) as a fluid is supplied into the tube, thereby generating a tensile force (a contraction force) that pulls both ends in the axial direction (an operating state). On the other hand, the McKibben artificial muscle contracts in the radial direction in accordance with an elastic force of the tube and the mesh and extends in the axial direction in a non-supply state where the gas is discharged from the tube, and returns to an original shape (a non-operating state).

The conflicting characteristics of the pressures at the predetermined points P1 and P2 in the variable pressure device 1A illustrated in FIG. 5, that is, conflicting characteristics of the pressures in the first operating unit AP1 and the second operating unit AP2 in FIG. 3 functions effectively in the actuation system 200 of FIG. 6. That is, it is possible to achieve a configuration in which, when the pressure in the first operating unit AP1 becomes high and the first operating unit AP1 contracts relatively, the pressure in the second operating unit AP2 becomes low and the second operating unit AP2 extends relatively, and on the contrary, when the pressure in the first operating unit AP1 becomes low and the first operating unit AP1 extends relatively, the pressure in the second operating unit AP2 becomes high and the second operating unit AP2 contracts relatively. That is, the first operating unit AP1 and the second operating unit AP2 in FIG. 3 can function as an agonist and an antagonist of the McKibben artificial muscle in the actuation system 200 of FIG. 6.

Figure 7:
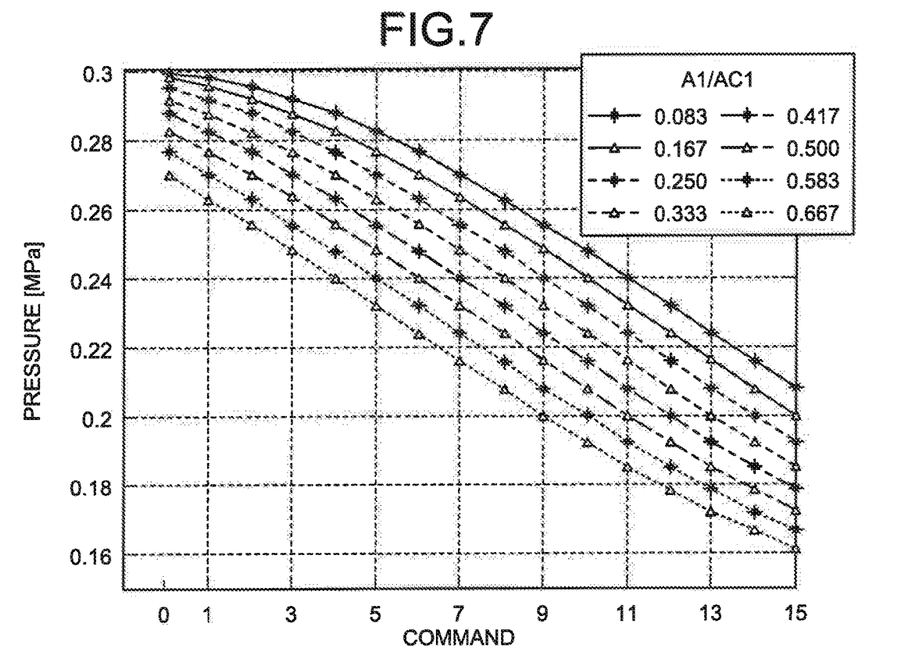
FIG. 7 is a graph illustrating an example of a pressure change by setting of a first adjusting regulator in the variable pressure device according to the second embodiment.

FIG. 7 is a graph illustrating a pressure change at the predetermined point P1 by variable setting of the first adjusting regulator RC11 in the variable pressure device 1A. FIG. 7 includes a plurality of graphs in a case where a ratio of an opening area A1 of the first regulator R11 with respect to an opening area AC1 of the first adjusting regulator RC11, A1/AC1 (hereinafter, simply "opening ratio") is changed. It is understood from FIG. 7 that the linearity of the pressure change at the predetermined point P1 with respect to a change of the total value of the opening areas (hereinafter, simply "linearity of pressure control") is changed in accordance with a value of the opening ratio A1/AC1. In this example, as the opening ratio A1/AC1 is higher, the linearity of pressure control is higher.

Further, it is understood from FIGS. 2 and 5 that the linearity of pressure control is lower in a range where the total value of the openings areas of the second regulators R21 to R24 is small (for example, a range where the command value is 4 or less) than in a range where the total value is large (for example, a range where the command value is larger than 4). The first adjusting regulators RC11 and RC12 are provided in parallel to the second regulators R21 to R24, as described above. Therefore, addition of the first adjusting regulators RC11 and RC12 to the channel constituting unit 50A is equivalent to providing an initial opening area (an offset value) to the total value of the opening areas of the second regulators R21 to R24. Accordingly, with the configuration of FIG. 3, it is possible to obtain the linearity of pressure control in the range where the total value of the opening areas of the second regulators R21 to R24 is small, which is as high as that in a configuration where the first adjusting regulators RC11 and RC12 are not provided in a range where the total value (the command value) is larger, by appropriately adjusting the opening areas of the first adjusting regulators RC11 and RC12.

Further, it is also possible to improve the linearity of pressure control by changing the set pressure by the pressure control valve 30 in accordance with the command value (total value of the opening areas of the second regulators R21 to R24). Specifically, in a range where the linearity of pressure control is low in FIG. 5, that is, the range where the total value of the opening areas of the second regulators R21 to R24 is small (for example, the range where the command value is 4 or less), for example, the ECU controls the pressure control valve 30 in such a manner that the set pressure is higher as the command value is smaller. This control can improve the linearity of pressure control.

Figure 8:
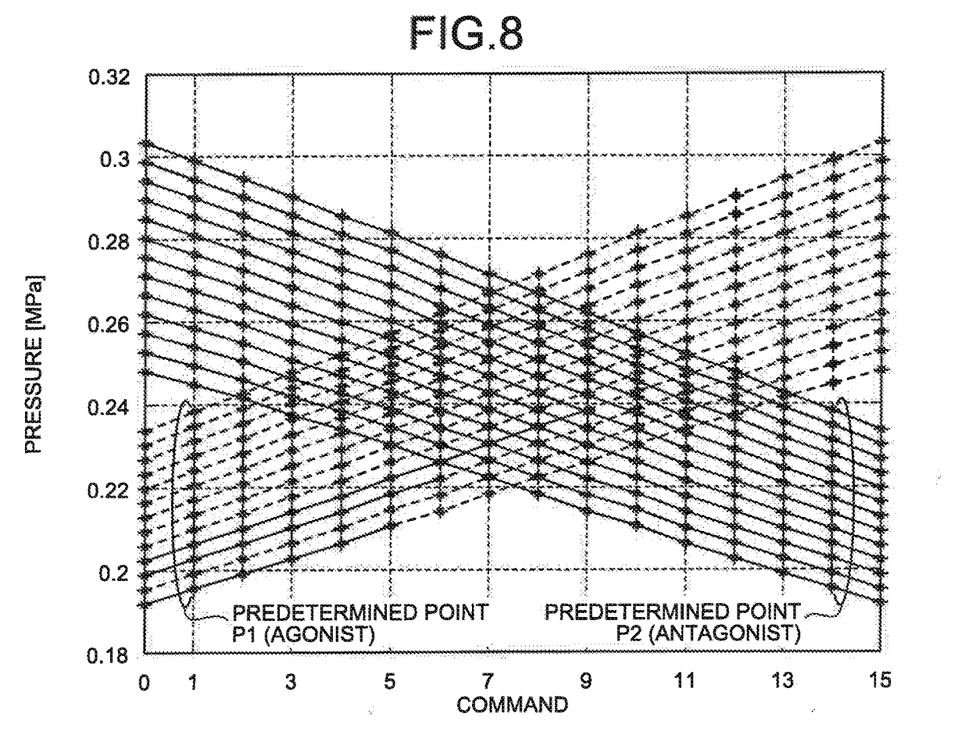
FIG. 8 is a graph illustrating an example of pressures that can be set in multiple stages by an adjusted or controlled variable pressure device according to the second embodiment.
Figure 9:
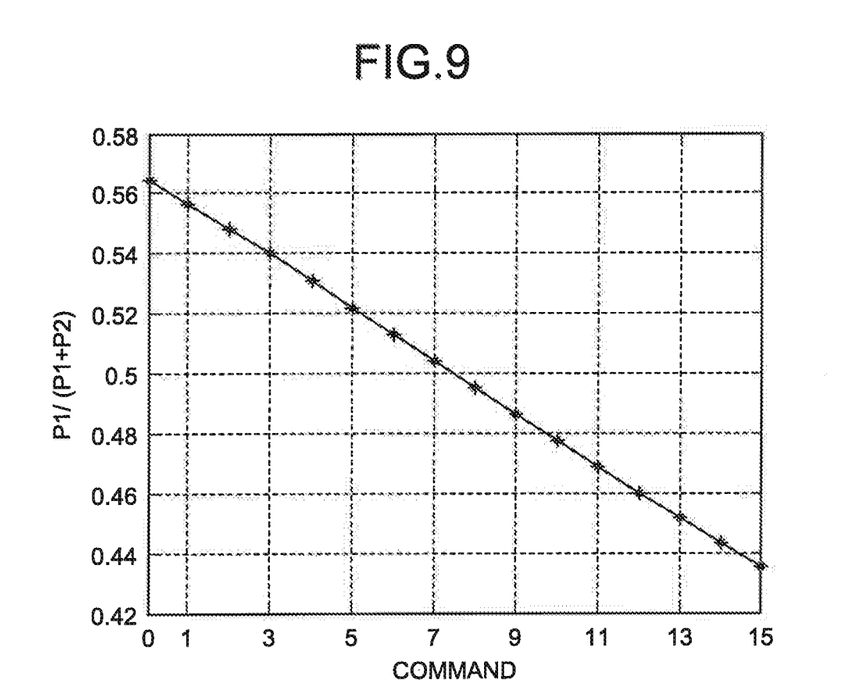
FIG. 9 is a graph illustrating an example of a ratio of a pressure at one point to the sum of the pressures at two points in which increasing and decreasing characteristics are contrary to each other in the adjusted or controlled variable pressure device according to the second embodiment.
Figure 10:
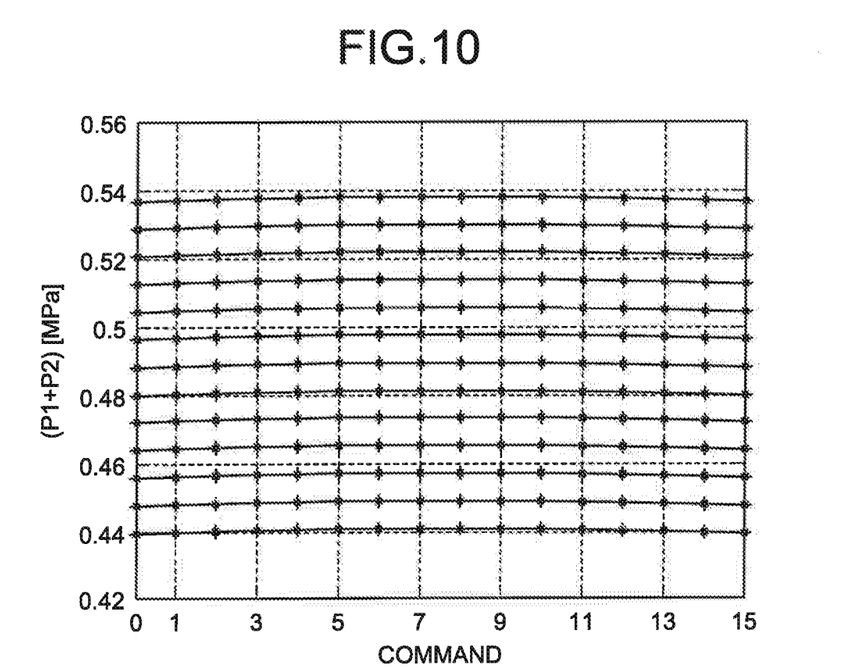
FIG. 10 is a graph illustrating an example of the sum of the pressures at two points in which increasing and decreasing characteristics are contrary to each other in the adjusted or controlled variable pressure device according to the second embodiment.

FIG. 8 is a graph illustrating pressures that can be set in multiple stages by an adjusted or controlled variable pressure device 1A. FIG. 9 is a graph illustrating a ratio of the pressure at the predetermined point P1 to the sum of the pressures at the predetermined point P1 and the predetermined point P2 (hereinafter, simply "pressure ratio") in the adjusted or controlled variable pressure device 1A. FIG. 10 is a graph illustrating an example of the sum of the pressures at the predetermined point P1 and the predetermined point P2 in the adjusted or controlled variable pressure device 1A.

As described above, in a second embodiment, the linearity of pressure control can be improved as illustrated in FIG. 8, by any of (1) appropriate setting of the opening ratio A1/AC1, adjustment of the opening ratio A1/AC1 by exchange of a component, or variable control of the opening ratio A1/AC1 by the ECU, (2) appropriate setting of the first adjusting regulators RC11 and RC12, adjustment of the first adjusting regulators RC11 and RC12 by exchange of a component, or variable control of the first adjusting regulators RC11 and RC12 by the ECU, and (3) variable control of the pressure control valve 30 by the ECU, or by a combination of them. Further, improvement of the linearity of pressure control as illustrated in FIG. 8 provides pressure-ratio characteristics with the high linearity as illustrated in FIG. 9 and pressure characteristics in which a change width of the total value of the pressures, corresponding to a change of the opening areas of the second regulators R21 to R24, is small (the variation is small) as illustrated in FIG. 10. The sum of the pressures in FIG. 10 can be changed by variable setting of the set pressure of the pressure control valve 30. In a case where the actuator 100A including the variable pressure device 1A is applied to the actuation system 200 of FIG. 6, FIG. 9 illustrates the characteristics of a change of an angle between the movable members 201 and 202, and FIG. 10 illustrates rigidity of the movable members 201 and 202. That is, according to the present embodiment, it is possible to obtain the actuation system 200 that has the angle-change characteristics with the high linearity and has a small change of the rigidity irrespective of the angle.

As described above, in the present embodiment, the switch valve mechanism 10A connects at least one of the second regulators R21 to R24 to one of the two first regulators R11 and R12 and also connects the remaining ones of the second regulators R21 to R24 to the other of the two first regulators R11 and R12. Therefore, according to the present embodiment, it is possible to obtain conflicting characteristics of the pressures at the predetermined points P1 and P2, for example, by the switch valve mechanism 10A.

In addition, the channel constituting unit 50A includes the first adjusting regulators RC11 and RC12 in the present embodiment. Therefore, according to the present embodiment, it is possible to improve the linearity of control for the pressures at the predetermined points P1 and P2, for example, by the first adjusting regulators RC11 and RC12.

Furthermore, the pressure control valve 30 adjusts the pressure in a channel in the channel constituting unit 50A to be variable in the present embodiment. Therefore, according to the present embodiment, it is possible to change the pressures at the predetermined points P1 and P2 and to further improve the linearity of the control for the pressures at the predetermined points P1 and P2 by the pressure control valve 30, for example.

Third Embodiment

Figure 11:
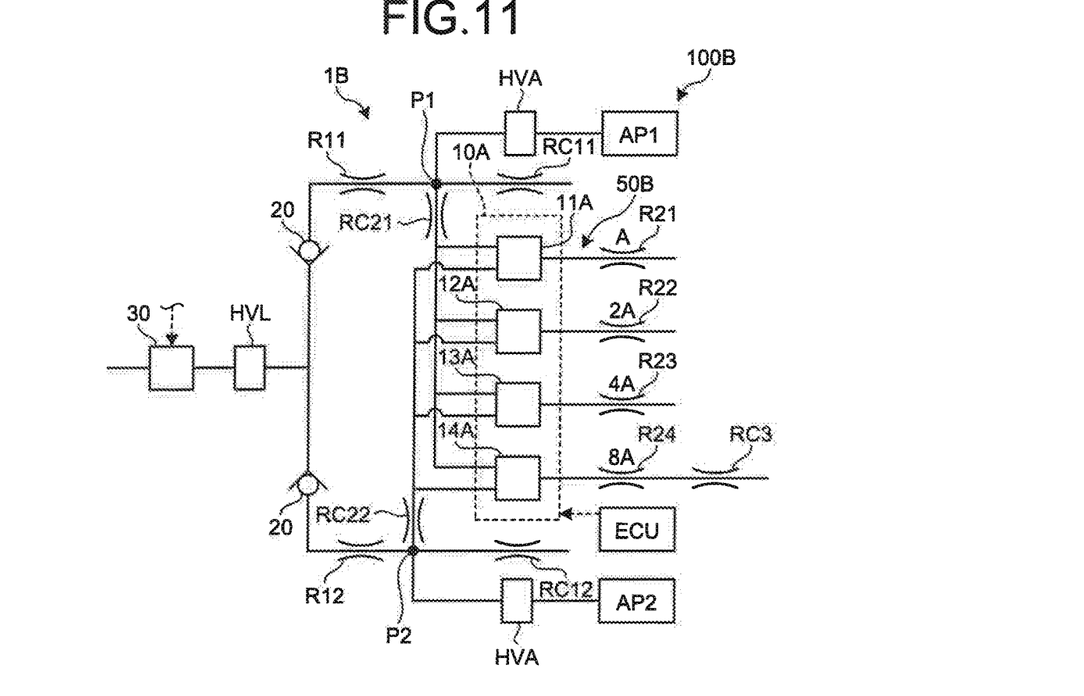
FIG. 11 is a schematic configuration diagram schematically and exemplarily illustrating an actuator including a variable pressure device according to a third embodiment.

FIG. 11 is a schematic configuration diagram of an actuator 100B including a variable pressure device 1B. A channel constituting unit 50B of the variable pressure device 1B includes a second adjusting regulator RC21 between the first regulator R11 and the switch valve mechanism 10A and a second adjusting regulator RC22 between the first regulator R12 and the switch valve mechanism 10A. That is, the first regulator R11, the second adjusting regulator RC21, and the switch valve mechanism 10A are arranged in series to one another, and the first regulator R12, the second adjusting regulator RC22, and the switch valve mechanism 10A are arranged in series to one another. The predetermined points P1 and P2 are set between the first regulators R11 and R12 and the second adjusting regulators RC21 and RC22, respectively. Therefore, as for the second adjusting regulators RC21 and RC22, the pressures at the predetermined points P1 and P2 are higher as compared with a case where these regulators are not provided. Each of the second adjusting regulators RC21 and RC22 may be constituted to be exchangeable or as a variable regulator including a movable portion that can change an opening area (channel resistance).

Further, the channel constituting unit 50B of the variable pressure device 1B includes a third adjusting regulator RC3. The third adjusting regulator RC3 is provided on a side of the switch valve mechanism 10A opposite to the first regulators R11 and R12 to be in series to the second regulator R24.

For some settings of units of the variable pressure device 1B, for example, the linearity of pressure control may be lower in a range where the total value of the openings areas of the second regulators R21 to R24 is large (for example, a range where the command value is 12 or more) than in a range where that total value is small (for example, a range where the command value is smaller than 12), as in the example of FIG. 2. The third adjusting regulator RC3 is provided in series to the second regulator R24 that has the largest opening area (the smallest channel resistance) among the second regulators R21 to R24. The second regulator R24 having the largest opening area allows a fluid to flow therethrough in a case where the total value of the opening areas of the second regulators R21 to R24 is relatively large. Therefore, addition of the third adjusting regulator RC3 in series to the second regulator R24 in the channel constituting unit 50B is equivalent to reduction of the total value of the opening areas of the second regulators R21 to R24 in a case where the total value of the opening areas of the second regulators R21 to R24 is large to such an extent that the fluid flows through the second regulator R24. Accordingly, with the configuration of FIG. 11, it is possible to obtain the high linearity of pressure control also in the range where the total value of the opening areas of the second regulators R21 to R24 is large by appropriately adjusting the opening area of the third adjusting regulator RC3.

The variable pressure device 1B includes a solenoid on-off valve HVA capable of confining the fluid in each of the first operating unit AP1 and the second operating unit AP2. The on-off valve HVA is also referred to as pressure holding valve. The variable pressure device 1B further includes a solenoid on-off valve HVL for preventing the fluid from flowing out between the pressure control valve 30 and the first regulators R11 and R12. The on-off valve HVL can be also referred to as "leak preventing valve". An ECU controls opening and closing of each of the on-off valves HVA and HVL. These on-off valves HVA and HVL are closed when operations of the first operating unit AP1 and the second operating unit AP2 are stopped and while the states of the first operating unit AP1 and the second operating unit AP2 are held. Due to this operation, it is possible to suppress outflow of the fluid and energy loss caused by the outflow.

As described above, the channel constituting unit 50B includes the second adjusting regulators RC21 and RC22 in a third embodiment. Therefore, according to the present embodiment, it is possible to variably set the pressures at the predetermined points P1 and P2, for example, by the second adjusting regulators RC21 and RC22.

In addition, the channel constituting unit 50B includes the third adjusting regulator RC3 in the present embodiment. Therefore, according to the present embodiment, it is possible to further improve the linearity of control for the pressures at the predetermined points P1 and P2, for example, by the third adjusting regulators RC3.

Fourth Embodiment

Figure 12:
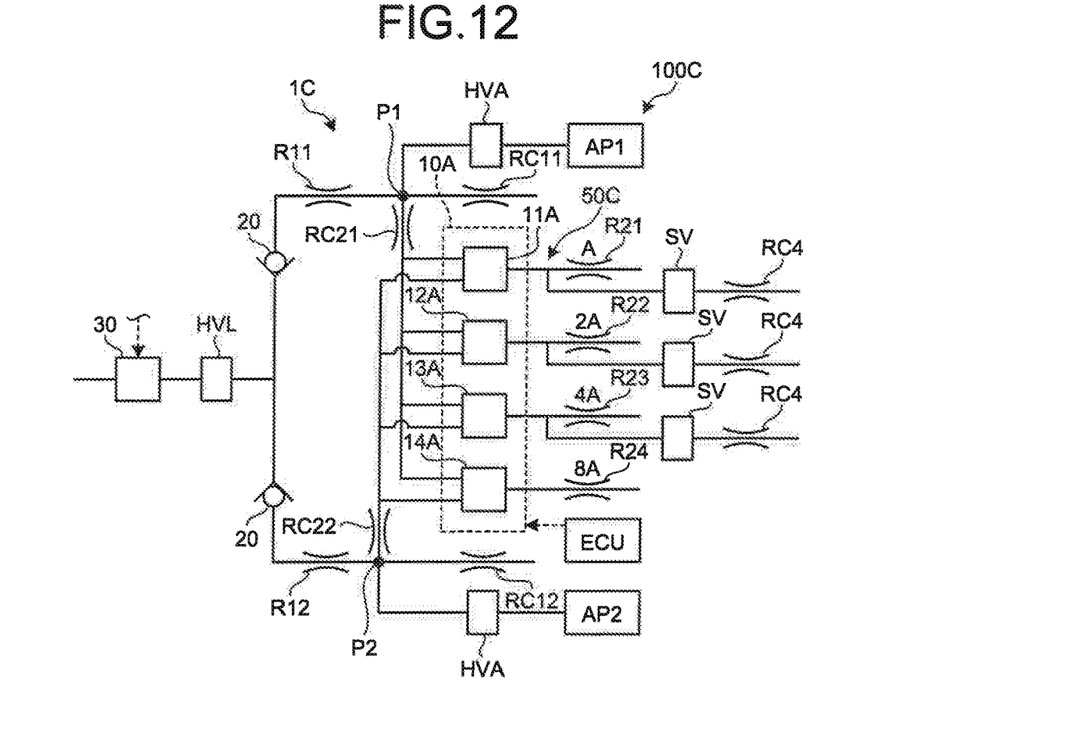
FIG. 12 is a schematic configuration diagram schematically and exemplarily illustrating an actuator including a variable pressure device according to a fourth embodiment.

FIG. 12 is a schematic configuration diagram of an actuator 100C including a variable pressure device 1C. A channel constituting unit 50C of the variable pressure device 1C includes fourth adjusting regulators RC4. The fourth adjusting regulators RC4 are provided on a side of the switch valve mechanism 10A opposite to the first regulators R11 and R12 and in parallel to the second regulator 24.

For some settings of units of the variable pressure device 1C, for example, the linearity of pressure control may be lower in a range where the total value of the openings areas of the second regulators R21 to R24 is large (for example, a range where the command value is 12 or more) than in a range where the total value is small (for example, a range where the command value is smaller than 12), as in the example of FIG. 2. The fourth adjusting regulator RC4 is provided in parallel to each of the second regulators R21 to R23 other than the second regulator R24 that has the largest opening area (the smallest channel resistance) among the second regulators R21 to R24. Further, a solenoid on-off valve SV is provided on the upstream side of the fourth adjusting regulator RC4, that is, between the fourth adjusting regulator RC4 and the switch valve mechanism 10A. An ECU controls opening and closing of the on-off valve SV. While each of the valves 11A to 13A of the switch valve mechanism 10A is in an open state, the pressures at the predetermined points P1 and P2 are lower in a state where the corresponding on-off valve SV is in an open state than that in a state where the corresponding on-off valve SV is in a closed state. In addition, the pressures in that case can be adjusted by selecting an opened on-off valve SV among the on-off valves SV. Therefore, with the configuration of FIG. 12, it is possible to obtain the high linearity of pressure control by appropriately adjusting the opening area of the fourth adjusting regulator RC4 and appropriately controlling opening and closing of the on-off valve SV. The fourth adjusting regulator RC4 is also an example of the third adjusting regulator RC3. The third adjusting regulator RC3 or the fourth adjusting regulator RC4 may be provided in series to the second regulators R21 to R24.

As described above, the channel constituting unit 50C includes the fourth adjusting regulators RC4 in a fourth embodiment. Therefore, according to the present embodiment, it is possible to further improve the linearity of control for the pressures at the predetermined points P1 and P2, for example, by the fourth adjusting regulators RC4.

Fifth Embodiment

Figure 13:
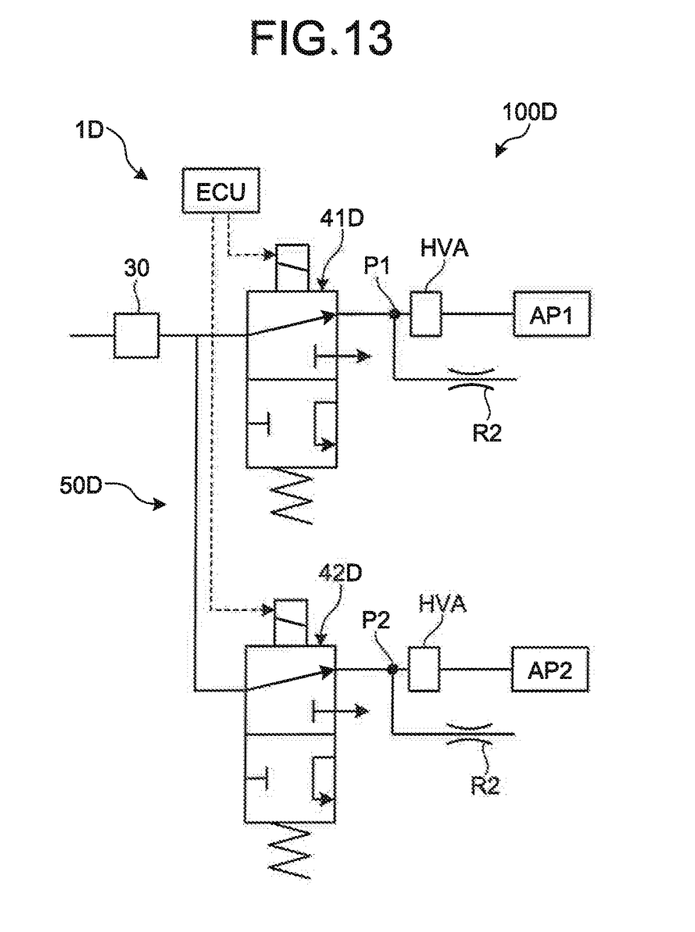
FIG. 13 is a schematic configuration diagram schematically and exemplarily illustrating an actuator including a variable pressure device according to a fifth embodiment.

FIG. 13 is a schematic configuration diagram of an actuator 100D including a variable pressure device 1D. The variable pressure device 1D includes duty valves 41D and 42D in place of the first regulators R11 and R12 and the switch valve mechanism 10A. The duty valves 41D and 42D are PWM-driven solenoid on-off valves. The duty valve 41D can switch an open state where a high-pressure side port (on the side of the pressure control valve 30) and a port on the side of the first operating unit AP1 are connected to each other and a closed state where the high-pressure side port is closed and the port on the side of the first operating unit AP1 and a drain are connected to each other. The duty valve 42D can switch an open state where a high-pressure side port (on the side of the pressure control valve 30) and a port on the side of the second operating unit AP2 are connected to each other and a closed state where the high-pressure side port is closed and the port on the side of the second operating unit AP2 and a drain are connected to each other. An ECU can change a substantial opening area (channel resistance) of each of the duty valves 41D and 42D by changing a duty ratio of PWM. In a case where the duty ratio in an open state is high, the duty valves 41D and 42D are equivalent to a regulator with a large opening area for a flow into the first operating unit AP1 or the second operating unit AP2 and a regulator with a small opening area for a flow from the first operating unit AP1 or the second operating unit AP2. In a case where the duty ratio in an open state is low, the duty valves 41D and 42D are equivalent to a regulator with a small opening area for the flow into the first operating unit AP1 or the second operating unit AP2 and a regulator with a large opening area for the flow from the first operating unit AP1 or the second operating unit AP2. Therefore, it can be said that the variable pressure device 1D of FIG. 13 includes the duty valve 41D equivalent to a variable regulator in place of the first regulator R11 and the second regulators R21 to R24 of the variable pressure devices 1A to 1C, and includes the duty valve 42D equivalent to a variable regulator in place of the first regulator R12 and the second regulators R21 to R24 of the variable pressure devices 1A to 1C. The second regulator R2 is provided in series to each of the duty valves 41D and 42D and has an identical function to those of the first adjusting regulators RC11 and RC12 of the variable pressure devices 1A to 1C (an improvement of the linearity).

For example, an ECU makes the duty ratio of the duty valve 42D in an open state low when the duty ratio of the duty valve 41D in an open state is high, makes the duty ratio of the duty valve 42D in an open state higher gradually from a state where it is low as the duty ratio of the duty valve 41D in an open state gradually becomes lower from a state where it is high, and makes the duty ratio of the duty valve 42D in an open state high when the duty ratio of the duty valve 41D in an open state is low. With this control, conflicting characteristics of the pressures at the predetermined points P1 and P2 are obtained as in the embodiments described above. The ECU may control the duty valves 41D and 42D with duty ratios in a closed state.

As described above, according to a fifth embodiment, the variable pressure device 1D includes the two parallel duty valves 41D and 42D for each of which a duty ratio of opening and closing can be variably set. When the duty ratio of one of the two duty valves 41D and 42D is high, the ECU makes the duty ratio of the other low. When the duty ratio of the one duty valve is low, the ECU makes the duty ratio of the other high. Therefore, according to the present embodiment, it is possible to obtain conflicting characteristics of the pressures at the predetermined points P1 and P2, for example, by appropriately controlling the two duty valves 41D and 42D by the ECU. It is also possible to constitute the variable pressure device 1D that can obtain the conflicting characteristics of the pressures at the predetermined points P1 and P2 to be relatively compact. Further, it is possible to more finely control the pressures at the predetermined points P1 and P2, for example.

Modification of Fifth Embodiment

Figure 14:
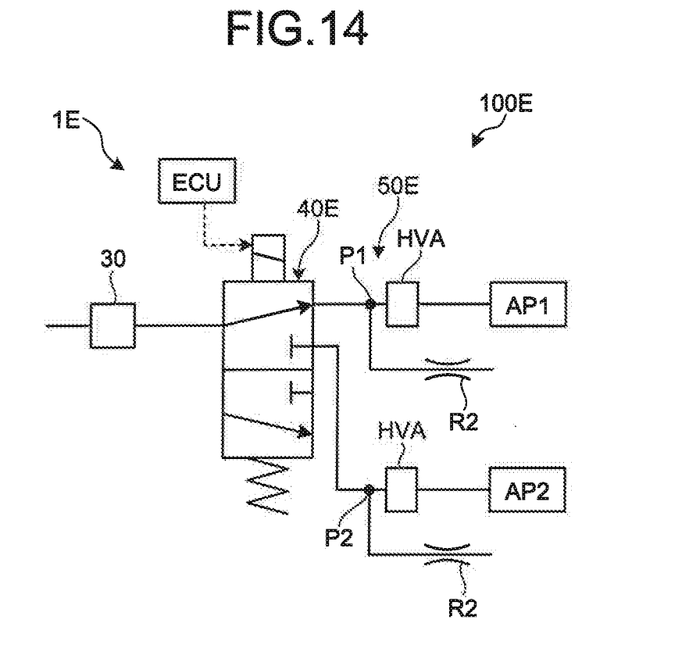
FIG. 14 is a schematic configuration diagram schematically and exemplarily illustrating an actuator including a variable pressure device according to a modification of the fifth embodiment.

FIG. 14 is a schematic configuration diagram of an actuator 100E including a variable pressure device 1E. In a modification of the fifth embodiment, one duty valve 40E is provided in place of the duty valves 41D and 42D. The duty valve 40E is a PWM-driven solenoid on-off valve. An ECU switches a first state where a high-pressure side port (on the side of the pressure control valve 30) and a port on the side of the first operating unit AP1 are connected to each other in the duty valve 40E and a second state where the high-pressure side port (on the side of the pressure control valve 30) and a port on the side of the second operating unit AP2 are connected to each other at a high speed. The ECU can change a ratio of an opening area (channel resistance) in the duty valve 40E in a channel on the side of the first operating unit AP1 and an opening area (channel resistance) in the duty valve 40E in a channel on the side of the second operating unit AP2 by changing a duty ratio of PWM. In this manner, conflicting characteristics of the pressures at the predetermined points P1 and P2 are obtained as in the embodiments described above.

As described above, according to the modification of the present embodiment, the variable pressure device 1E includes the duty valve 40E that switches a first state where one path is in an open state and the other path is in a closed state and a second state where the one path is in a closed state and the other path is in an open state. Therefore, according to the present embodiment, it is possible to obtain conflicting characteristics of the pressures at the predetermined points P1 and P2, for example, by appropriately controlling the duty ratio of the duty valve 40E by the ECU. It is also possible to constitute the variable pressure device 1E that can obtain the conflicting characteristics of the pressures at the predetermined points P1 and P2 to be relatively compact. Further, it is possible to more finely control the pressures at the predetermined points P1 and P2, for example.

Although embodiments of the present invention have been exemplified above, the above embodiments are only examples, and the scope of the invention is not intended to be limited to these embodiments. These embodiments can be carried out in other various modes, and various omissions, replacements, combinations, and changes can be made without departing from the scope of the present invention. These embodiments are included in the spirit and scope of the invention and are also included in the inventions described in the claims and their equivalents. Further, specifications of respective configurations, shapes, and the like (structure, type, direction, shape, dimension, length, width, thickness, height, number, arrangement, position, material, and the like) can be changed as appropriate and carried out. For example, the configurations and methods described in the above embodiments are applicable to various inspection objects in an environment in which noise is propagated from one direction.

For example, a flowing direction of a fluid may be opposite in the variable pressure devices 1 and 1A to 1E. In other words, a fluid may flow from the second regulators R21 to R24 to the first regulator R1 or the duty valve 40E or the duty vales 41D and 42D. Further, the channel constituting units 50 and 50A to 50E can be constituted as various types of equivalent fluid circuits.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An actuator comprising:
   a variable pressure device comprising:
      a channel constituting unit that constitutes a channel including two first regulators that are provided in parallel to each other and second regulators that are arranged in series to the first regulators and are in parallel to one another; and
      a switch valve mechanism that selectively connects at least one of the second regulators to one of the two first regulators and connects remaining ones of the second regulators to the other of the two first regulators;
   a first operating unit that is caused to operate by a fluid between one of the two first regulators and the switch valve mechanism; and
   a second operating unit that is caused to operate by the fluid between the other of the two first regulators and the switch valve mechanism, wherein
   opening areas of the second regulators are different from one another,
   the first regulators are placed between a high-pressure source of the fluid and the switch valve mechanism,
   the switch valve mechanism includes valves each provided between the first regulators and corresponding one of the second regulators, and
   a pressure at a point between the first regulators and the switch valve mechanism is variably set depending on the selective connection by the switch valve mechanism.

2. The actuator according to claim 1, wherein the second regulators include n second regulators each of which having an opening area of $A \times 2^{(i-1)}$ (where A is a positive real number, i=1, 2, ..., n, and n is an integer larger than 1).

3. The actuator according to claim 1, wherein the channel constituting unit includes a first adjusting regulator provided in parallel to the second regulators.

4. The actuator according to claim 1, wherein the variable pressure device further comprises a pressure control valve that variably adjusts a pressure in the channel in the channel constituting unit.

5. The actuator according to claim 1, wherein the channel constituting unit includes a second adjusting regulator provided between the first regulators and the switch valve mechanism.

6. The actuator according to claim 1, wherein the channel constituting unit includes a third adjusting regulator provided on a side of the switch valve mechanism opposite to the first regulators to be in parallel to any one of the second regulators.

* * * * *